United States Patent [19]

Pihl

[11] Patent Number: 5,683,197

[45] Date of Patent: Nov. 4, 1997

[54] CONNECTOR DEVICE

[75] Inventor: Karl Anders Gunnar Pihl, Bournsmouth, United Kingdom

[73] Assignee: Flexlink Systems AB, Göteborg, Sweden

[21] Appl. No.: 594,337

[22] Filed: Jan. 30, 1996

[30] Foreign Application Priority Data

Jan. 31, 1995 [SE] Sweden .................................. 9500344

[51] Int. Cl.[6] ...................................................... F16B 2/14
[52] U.S. Cl. ........................ 403/170; 403/217; 403/362; 403/230
[58] Field of Search ............................ 403/170, 171, 403/174, 176, 178, 217, 230, 314, 256, 407.1, 257, 403

[56] References Cited

U.S. PATENT DOCUMENTS

| | | | |
|---|---|---|---|
| 1,021,185 | 3/1912 | Foster | 403/256 X |
| 1,064,357 | 6/1913 | Mellon | 403/256 X |
| 3,537,736 | 11/1970 | Kroopp | 403/409.1 X |
| 3,672,710 | 6/1972 | Kroopp | 403/134 X |
| 4,116,573 | 9/1978 | Fuchs | 403/407.1 X |
| 4,932,808 | 6/1990 | Bar et al. | 403/171 X |
| 5,184,920 | 2/1993 | Strassle | 403/176 X |

FOREIGN PATENT DOCUMENTS 410 649  10/1979  Sweden .

*Primary Examiner*—Anthony Knight
*Assistant Examiner*—William L. Miller
*Attorney, Agent, or Firm*—Burns, Doane, Swecker & Mathis, L.L.P.

[57] ABSTRACT

A connector device for interconnecting frame-work profiles provided with internal hollow channels and at least one T-shaped longitudinal slot in end-to-end and end-to-sideface relations includes a generally parallelepiped shaped connector having a through bore which receives one element in the form of a screw that is adapted to be firmly attached to a first framework profile in end-to-end relation thereto and a second element in the form of a T-connector member for effecting connection with a second framework profile. The T-connector member has a thin element that is adapted to pass through the T-shaped longitudinal slot of the second framework profile in a first position of the T-connector member, and to be broader than the slot in a second position of the T-connector member so that the T-connector member is trapped in a cavity in the interior of the second framework profile behind the slot. The T-connector member is provided with a tapering bore that is engaged by a set screw which threadably engages a bore in the parallelepiped shaped connector for moving the T-connector member from the first position to the second position.

15 Claims, 2 Drawing Sheets

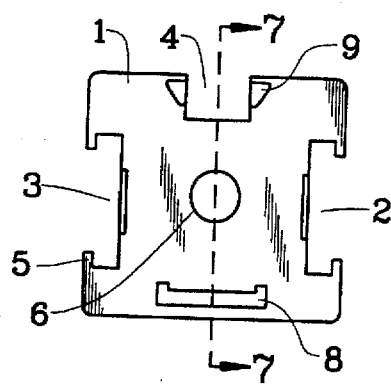
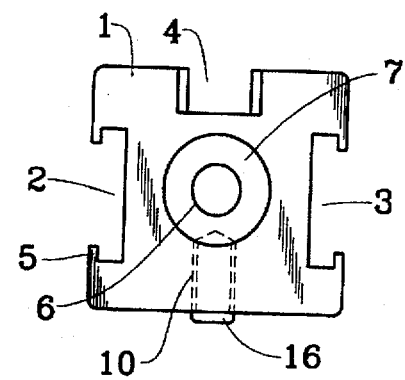
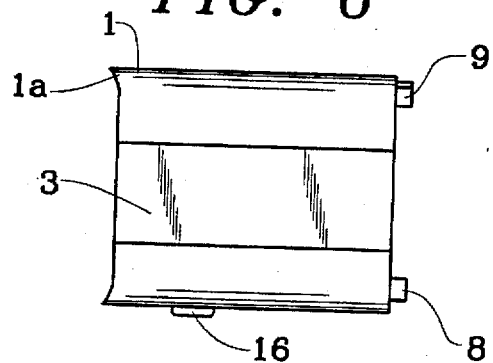
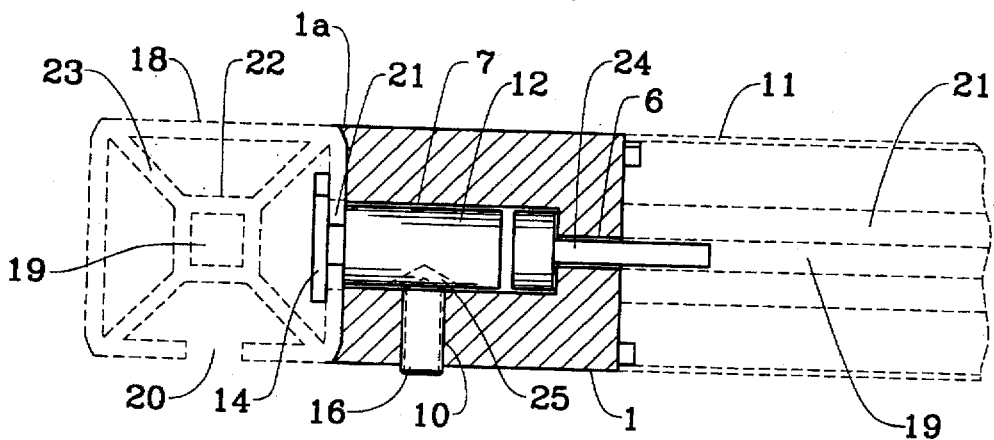
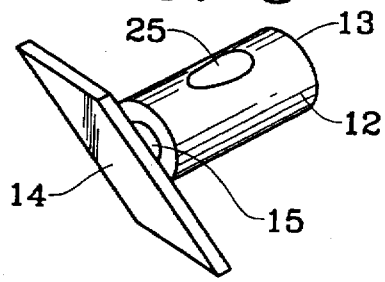
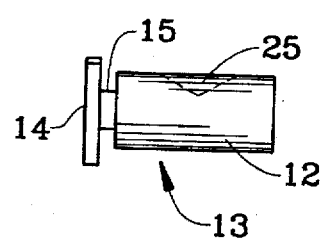
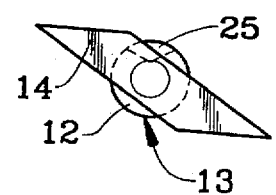

CONNECTOR DEVICE

FIELD OF THE INVENTION

The present invention pertains to a connector device and more particularly to a connector device used primarily for interconnecting profiles for frameworks of different kinds.

BACKGROUND OF THE INVENTION

Frameworks for different purposes, such as apparatus cubicles, protective covers and the like typically include hollow profiles of a proper material, such as aluminum or plastic. The hollow profiles are interconnected to form the frameworks, wherein different types of panels, doors and the like are fitted. To interconnect such profiles in end-to-end relation, connectors have been used which include screw devices adapted to be screwed into hollow channels in the profiles. For effecting interconnection in the transverse direction, i.e. in the end-to-sideface relation, profiles having T-shaped longitudinal slots in their side faces have been utilized, whereby the connector is equipped with a locking key arranged to be positioned in the T-slot in such a manner that it cannot be pulled out of the T-shaped slot.

Although such framework systems are somewhat expedient and easy to handle, they are susceptible of improvements.

SUMMARY OF THE INVENTION

The present invention is adapted to provide an improved connector device for frameworks such as those mentioned above, and to provide a connector device which further simplifies handling and storage.

In accordance with one aspect of the present invention, a connector device for interconnecting first and second framework profiles provided with internal hollow channels and at least one T-shaped longitudinal slot in end-to-end and end-to sideface relations includes a connector having one opening which receives an element that is firmly attachable to the first framework profile to position the connector in end-to-end relation to the first framework profile and another opening for receiving a T-connector member provided with a thin element that is adapted to pass through the T-shaped longitudinal slot in the second framework profile in a first position of the T-connector member and to be broader than the T-shaped longitudinal slot in the second framework profile in a second position of the T-connector member so that the thin element is trapped in a cavity in an interior of the second framework profile behind the slot. The T-connector member is provided with means for moving the T-connector member from the first position to the second position through operation of an actuating member which is operable from exterior of the connector.

According to another aspect of the present invention, a connector device for interconnecting a first framework profile having an opening and a second framework profile provided with at least one longitudinal opening along one side wall that opens into a cavity includes a connector having one opening that opens to one end of the connector, another opening which opens to another end of the connector, and a bore that opens into the other opening. A first connecting member is receivable in the one opening for engaging the opening in the first framework portion to firmly attach the connecting member to the first framework profile and position the connector in end-to-end relation to the first framework profile. A second connecting member is positionable in the other opening in the connector. The second connecting member is provided with an end portion adapted to extend outwardly beyond the end of the connector for being inserted through the opening in the second framework profile in a first position of the second connecting member and is movable to a second position in which the end portion of the second connecting member is prevented from being removed through the opening in the second framework profile. An actuating member is positionable in the bore of the connector to engage the second connecting member upon operation of the actuating member, and the second connecting member is provided with an arrangement for causing the second connecting member to move from the first position to the second position upon operation of the actuating member to thereby secure the connector in position with respect to the second framework profile.

In accordance with a preferred embodiment of the invention, the arrangement for causing the second connecting member or T-connecting member to move from the first position to the second position is a tapering bore formed in the second connecting member. The tapering bore is engaged by the actuating member, which can be in the form of a set screw, to effect rotation of the second connecting member from the first position to the second position.

BRIEF DESCRIPTION OF THE DRAWING FIGURES

The present invention will be described in detail below with reference to the accompanying drawing figures in which like elements are designated by like reference numerals and wherein;

FIG. 4 is an end view of the connector device shown in FIG. 1;

FIG. 5 is an end view of the connector device shown in FIG. 1 as seen from the end opposite that depicted in FIG. 4;

FIG. 6 is a side view of the connector device shown in FIG. 4;

FIG. 7 is a longitudinal sectional view of the connector device along the section line VII—VII in FIG. 4;

FIG. 8 is a perspective view of a T-connector member forming part of the connector device according to the present invention;

FIG. 9 is a side view of the T-connector member depicted in FIG. 8; and

FIG. 10 is an end view of the T-connector depicted in FIG. 8.

DETAILED DESCRIPTION OF THE INVENTION

Figure 1:
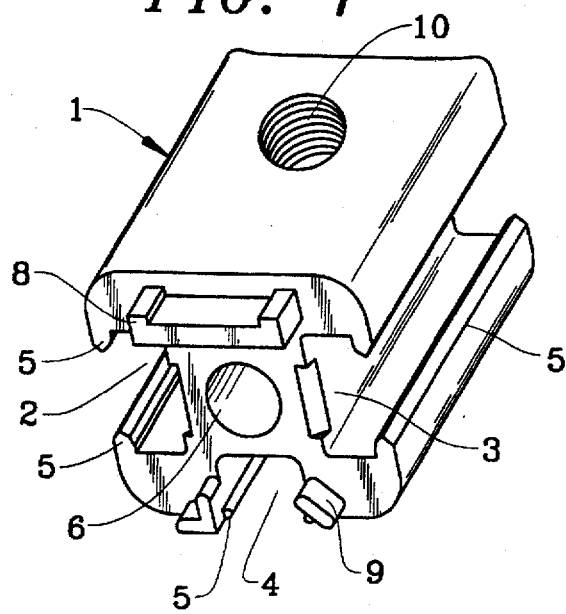
FIG. 1 is a perspective view of a connector device according to the present invention.

The connector device 1 shown in perspective in FIG. 1 includes a generally parallelepiped-shaped connector member provided with a longitudinal groove 2, 3, 4 in each one of three adjoining longitudinal side surfaces. Each of the longitudinal grooves 2, 3, 4 is provided with oppositely positioned side ledgers 5 that are disposed adjacent the external surface of the respective longitudinal side. The pair of side ledgers 5 associated with each groove 2, 3, 4 project towards each other and so each groove has a wider bottom portion as compared to its entrance portion. Thus, each of the grooves 2, 3, 4 defines a generally T-shaped slot.

A centrally disposed bore portion 6 extends longitudinally through the connector from one short end thereof. As seen for example in FIG. 7, this bore portion 6 extends a distance from the end wall that is visible in FIG. 1 and continues into a concentric bore portion 7 of substantially larger diameter. The two bore portions 6, 7 together define a bore extending completely through the connector.

The end surface of the connector that is visible in FIG. 1 is provided with a number of projections 8, 9 which protrude out from the connector 1 in its longitudinal direction. The function associated with these projections 8, 9 will be further described below. In the longitudinally extending side surface which is not provided with a longitudinal groove there is arranged a threaded bore 10 extending through the material of the connector and opening into the enlarged bore portion 7.

Figure 2:
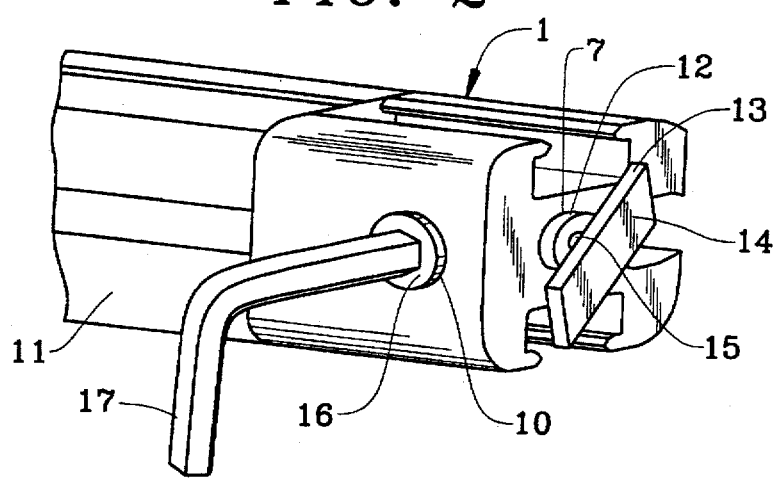
FIG. 2 is a perspective view of the connector device shown in FIG. 1 fitted to a framework profile.

FIG. 2 illustrates how the connector 1 according to the present invention is attached in end-to-end relation to a first framework profile 11 so that it projects in the longitudinal direction from the first framework profile 11. The connector 1 is secured to the first framework profile 11 in a manner to be described hereinafter in connection with FIG. 7. A cylindrical body portion 12 of a T-connector member 13 is inserted into the larger bore portion 7 of the connector device 1. The cylindrical body portion 12 has a rhombic-shaped thin element 14 fitted thereto via a short shaft member 15 of small diameter. An actuating member in the form of a set screw 16 is received in the threaded bore 10 of the connector device. In a manner described below in more detail, this set screw 16 can be caused to act upon the cylindrical body 12 of the T-connector member 13 by way of a key 17.

Figure 3:
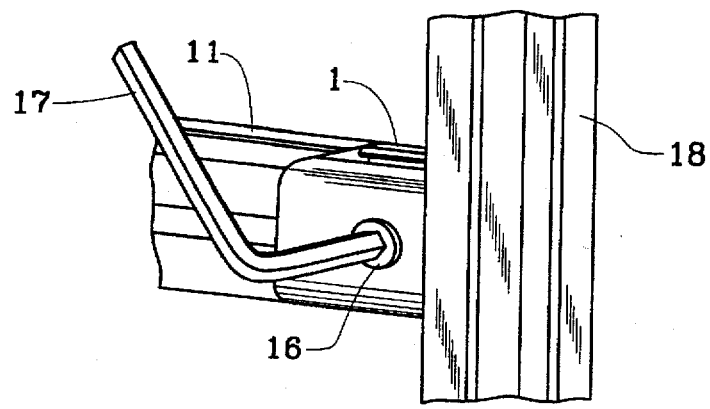
FIG. 3 is a perspective view of a connector device according to the present invention fitted in the longitudinal direction to a first framework profile and fitted also in the transverse direction to a second framework profile.

FIG. 3 illustrates how the connector member 1 fitted in the manner shown in FIG. 2 in end-to-end relation to the first framework profile 11 is also fitted with its opposite end, and the rhombic T-shaped connector member situated therein, to a second frame-work profile 18 in the transverse direction of the second framework profile 18.

FIG. 4 shows the connector device 1 as seen from the end that is visible in FIG. 1, while FIG. 5 shows the connector from the opposite end. FIG. 5 depicts the bigger bore portion 7 and the adjoining bore portion 6 of smaller diameter. FIG. 5 also shows, in dash-lines, the extension of the threaded bore 10 and the set screw 16 that has been partially screwed into the bore 10 so that the tip of the set screw 16 projects into the cavity of the bore 7. FIG. 6 shows the connector device 1 in plan view as seen from the left hand side of FIG. 4, with the set screw 16 inserted in the bore 10. FIG. 6 also illustrates how the short end of the connector device 1 that is not provided with the guiding projections 8, 9, has ridge-wise projecting side edges 1a.

FIG. 7 is a sectional view of the connector device 1 according to the present invention taken along the section line VII—VII in FIG. 4 and depicts the way in which the connector device is fitted in end-to-end relation with a first framework profile member 11 and in a transverse direction to a second framework profile member 18. Both of the profiles 11, 18 are preferably identical in shape and both have a centrally disposed through-opening 19 extending in the longitudinal direction of the profile. The outer cross-section of each profile 11, 18 is generally parallelepiped in shape and generally corresponds in shape and size to that of the connector device 1. Centrally disposed in at least one of the longitudinal side walls of the profiles 11, 18 is a longitudinal opening 20, 21. The openings 20, 21 open into a cavity to define generally T-shaped slots which generally resemble the grooves 2, 3, 4 in the connector device 1.

In the embodiment of the profile illustrated in the drawing figures, the centrally disposed through opening 19 is provided in a central boss-like formation 22 which, via oblique strut members 23, is connected to the corners of the shell-like outer wall of the respective profile member. Thus, it is possible to easily punch out such slot-formed longitudinal openings in as many longitudinal side surfaces of the profile as is desirable for each specific need. The edge projections 1a referred to in connection with FIG. 6 are adapted to fit closely to the outer somewhat rounded contour of the second framework profile 18, thereby providing in the mounted position an engagement which helps ensure that the connector device and the profile cannot move angularly relative to each other.

The material from which the profiles 11, 18 are fabricated, or at least the boss-formed central portion 22, is such that a self-tapping screw can be easily screwed into the centrally disposed through opening 19 of the boss 22. Such materials may be aluminum, plastics, etc.

The right hand portion of FIG. 7 shows how the connector 1 is connected to the first framework profile 11 in end-to-end relation so that the end face of the profile 11 faces the end wall of the connector 1 that is provided with the projecting formations 8, 9. In the bore 6, 7 of the connector is introduced a self-tapping screw or bolt 24. The self-tapping screw or bolt 24 has a stem that is somewhat smaller than the small diameter bore portion 6 of the bore and a head of a diameter bigger than that of the small diameter bore portion 6 but smaller than the diameter of the larger diameter bore portion 7. This screw or bolt 24 when inserted in the bore portions 6, 7 projects with its threaded end out through the opening of the bore 6 so that it can be screwed into the opening 19 of the first framework profile 11 to thereby fixedly connect the connector device 1 to the first framework profile 11. The head of the screw or bolt 24 is larger than the smaller diameter bore portion 6 so that the screw head engages the transition wall between the two bore portions 6, 7. When the connector device 1 and the first framework profile 11 are matched together before the bolt is tightened or during the tightening operation, the projections 8, 9 guide and center the two members relative to each other with the projections 8, 9 thereby entering into the free spaces in the interior of the profile.

As can be seen in the left hand portion of FIG. 7, the connector is also adapted to be connected to the longitudinal side of a second framework profile 18 so as to be disposed in transverse relation thereto. For this purpose, the T-connector member 13 is utilized and this connector member 13 is shown in detail in FIGS. 8–10.

As briefly mentioned above, this T-connector member 13 includes a cylindrical short body portion 12 dimensioned so that the body portion can be rotatably positioned in the larger bore portion 7 of the connector device 1. A short shaft member 15 projects from one side face of the cylindrical body 12 and this shaft member 15 at its opposite end is provided with a thin, rhombic element 14. A tapering bore 25 is provided in the outer surface of the cylindric body 12. The thin rhombic element 14 and the tapering bore 25 of the T-connector member 13 are positioned relative to each other so that the axis of the bore 25 and the long side surfaces of the thin rhombic element 14 are disposed at an oblique angle to each other as seen with reference to, for example, FIG. 10.

As can be seen in FIG. 7, the rhombic element 14 is inserted in the T-slot opening 21 in the second profile member 18, this being accomplished when the long side surfaces of the rhombic member 14 are positioned substantially parallel with the side edges of the opening 21 in the second profile member 18. In this position, the axis of the tapering bore 25 in the cylindrical body 12 of the T-connector member 13 is oriented in a direction different from the direction of orientation of the axis of the threaded bore 10 in the connector device 1.

As the set screw 16 is screwed into the bore 10, the pointed tip of the set screw 16 begins to act upon the surface of the tapering bore 25, thereby causing the cylindrical body 12 of the T-connector member 13 to make an angular rotational movement in the larger diameter bore portion 7. This causes the thin rhombic element 14 to be moved in the T-shaped slot in the second framework profile 18 so that the longitudinal side edges of the element 14 are no longer parallel with the edges of the opening 21, thereby preventing the T-connector member 13 from being pulled out of the longitudinal opening 21 in the second profile 18. As the set screw 16 is screwed into its innermost position, the pointed end of the set screw 16 enters into the tapering bore 25 in the cylindrical body 12 to eventually lock the body 12 in position, thereby providing a safe and secure grip between the connector device 1 and the profile in end-to-end relation as well as in the transverse relation.

With this design of the connector device according to the invention, different connecting facilities have been combined in a single connector device thereby simplifying handling and storing thereof.

When the connector device 1 is fitted in end-to-end relation to a first profile 11, as mentioned above, the projections 8, 9 of the connector device are positioned so that they guide the connector device relative to the profile, thereby projecting into the internal cavities of the profile. The self-tapping screw 24 then is inserted through the central bore 6, 7 and is screwed into the central channel 19 of the profile, thereby fixing the connector device 1 securely to the first framework profile.

Thereupon, the T-connector member 13 is inserted in the larger diameter bore portion 7 with its thin rhombic element 14 and its shaft member 15 projecting from the free end of the larger diameter bore portion 7. The thin rhombic element 14 is positioned so that its two parallel long sides are substantially aligned with the edges of the T-slot opening 21 in the second profile 18. Thus, the thin rhombic element 14 is able to enter into the cavity behind the opening 21. In this position of the T-connector member 13, the tapering bore 25 in the cylindrical body 12 is positioned with its axis at an angle (i.e., not parallel) to the axis of the threaded bore 10 in the connecting device 10. As the set screw 16 is then tightened, the pointed tip of the screw 16 contacts the tapering wall of the bore 25 and as the set screw is tightened further the cylindric body 12 moves until the axis of the tapering bore 25 is substantially aligned with the axis of the bore 10. In this position the thin rhombic element 14 is located so that its parallel long sides are positioned at an angle to the edges of the opening 21, thereby effectively securing the connector to the second framework profile 18 and firmly interconnecting the two framework profiles.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. In combination, an connector device interconnecting first and second framework profiles provided with internal hollow channels and at least one T-shaped longitudinal slot in end-to-end and end-to-sideface relations, comprising a connector having one longitudinally oriented opening which receives an element that is firmly attached to the first framework profile positioning the connector in end-to-end relation to the first framework profile, said connector having another opening for receiving a T-connector member provided with a thin element that passes through the T-connector shaped longitudinal slot in the second framework profile in a first position of the T-connector member and that is broader than the T-shaped longitudinal slot in the second framework profile in a second position of the T-connector member so that the thin element is trapped in the T-shaped slot of the second framework profile, said T-connector member having means for moving said T-connector member from said first position to said second position through operation of an actuating member which is operable from exterior of said connector.

2. The combination as claimed in claim 1, wherein the connector is a parallelepiped member, said one opening and said another opening together defining a centrally located through bore extending longitudinally through the parallelepiped member, said one opening defining a first bore portion of the centrally located through bore and the another opening defining a second bore portion of the centrally located through bore, the second bore portion having a larger diameter that said first bore portion, said element that is received in the opening being a screw which is positioned in the centrally located through bore and has a threaded end projecting out from the first bore portion and screwing into a central channel in the first framework profile, said screw having a screw head positioned in the second bore portion and abutting a transition wall between said first and second bore portions.

3. The combination as claimed in claim 1, wherein the connector is a parallelepiped member, said one opening and said another opening together defining a centrally located through bore extending longitudinally through the parallelepiped member, said one opening defining a first bore portion of the centrally located through bore which opens at one end of the parallelepiped member and the another opening defining a second bore portion of the centrally located through bore which opens at an opposite end of the parallelepiped member, the second bore portion having a larger diameter that said first bore portion, said T-connector member having a cylindrical body portion received in the second bore portion and the thin element being adapted to project from the end of the connector at which the second bore portion opens.

4. The combination as claimed in claim 1, wherein the connector is a parallelepiped member and said opening is a centrally located through bore extending longitudinally through the parallelepiped member, said bore having a first bore portion opening at one end of the parallelepiped member and a second bore portion opening at an opposite end of the parallelepiped member, the second bore portion having a larger diameter that said first bore portion, said element that is firmly attached to the first framework profile being at least partially received in the first bore portion and the T-connector member being at least partially received in the second bore portion.

5. The combination as claimed in claim 4, wherein the T-connector member has a cylindrical body portion to which is connected the thin element by way of a coaxially arranged shaft, the cylindrical body portion of the T-connector being rotatably received in the second bore portion of the connector device, the cylindrical body portion being provided with said means for moving said T-connector member from said first position to said second position.

6. The combination as claimed in claim 5, wherein said thin element includes opposed long sides, said means for moving said T-connector member from said first position to said second position including a tapering bore having an axis that is angularly displaced from the opposed long-sides of the thin element, said actuating member which is operable from exterior of said connector being a set screw positioned in a through bore in the parallelepiped member, said through bore which receives the set screw perpendicularly intersecting the second bore portion and said set screw having an end adapted to be tightenable by a key for causing the T-connector to rotate in the second bore portion through interaction between an end of said set screw and a tapering wall of the tapering bore.

7. In combination, a connector device interconnecting a first framework profile having an opening and a second framework profile provided with at least one longitudinal opening along one side wall that opens into a cavity, comprising:

a connector having a first end and a second end that faces in a direction opposite the first end, said connector being provided with one opening that opens to the first end of the connector, another opening which opens to the second end of the connector, and a bore that opens into the another opening;

a first connecting member received and in the one opening and engaging the opening in the first framework portion such that the first connecting member attaches to the first framework profile and positions the connector in end-to-end relation to the first framework profile;

a second connecting member positioned in the another opening in the connector, said second connecting member having an end portion extending outwardly beyond said second end of the connector and inserted through the opening in the second framework profile in a first position of the second connecting member and being movable to a second position in which said end portion of the second connecting member is prevented from being removed through the opening in the second framework profile;

an actuating member positionable in the bore of the connector to engage the second connecting member upon operation of the actuating member; and means operatively associated with said second connecting member for causing said second connecting member to move from said first position to said second position upon operation of said actuating member to secure said connector in position with respect to said second framework profile.

8. The combination as claimed in claim 7, wherein said second connecting member includes a cylindrical portion that is rotatably positioned in said another opening and a shaft member extending from the cylindrical portion, said end portion of the second connecting member being disposed at an end of the shaft member.

9. The combination as claimed in claim 8, wherein said means for causing said second connecting member to move from said first position to said second position includes a tapering bore provided in the cylindrical portion of the second connecting member.

10. The combination as claimed in claim 7, wherein said means for causing said second connecting member to move from said first position to said second position includes a tapering bore provided in the second connecting member.

11. The combination as claimed in claim 10, wherein said tapering bore has an axis and said end portion of the second connecting member includes opposed long sides that are oriented obliquely with respect to the axis of the tapering bore.

12. The combination as claimed in claim 7, wherein said one opening and said another opening in said connector together define a centrally located through bore extending longitudinally through the connector, said one opening defining a first bore portion of the centrally located through bore which opens at the first end of the connector and the another opening defining a second bore portion of the centrally located through bore which opens at the second end of the connector, the second bore portion having a larger diameter than said first bore portion.

13. The combination as claimed in claim 7, including a plurality of projections extending from at least one of said first and second ends of said connector.

14. The combination as claimed in claim 7, wherein said bore in the connector is a threaded bore.

15. The combination as claimed in claim 7, wherein said another opening in the connector possesses a diameter that is larger than said one opening in the connector.

* * * * *